June 12, 1956     I. B. HALL     2,749,646
LURE CASTING DEVICE
Filed May 21, 1954
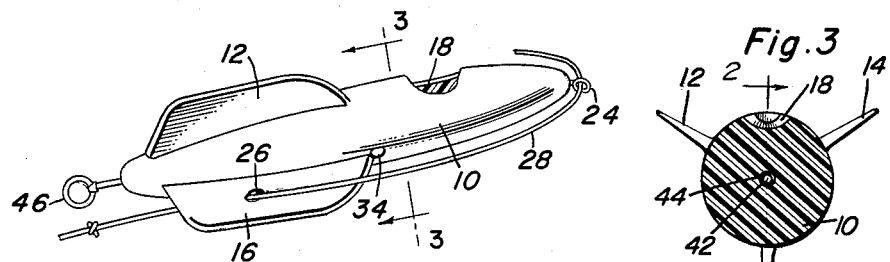
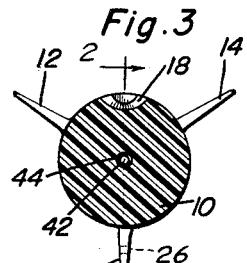
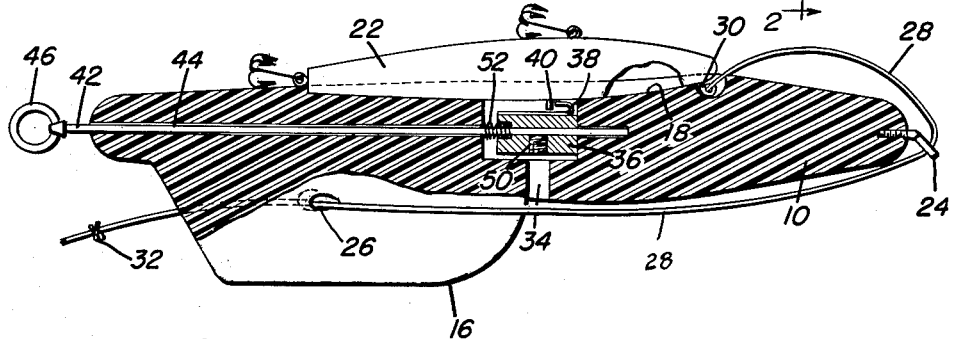
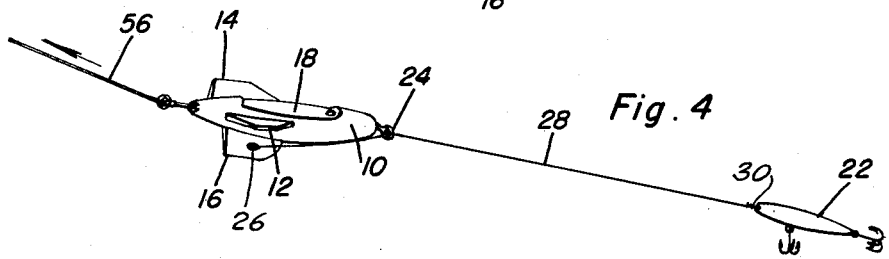
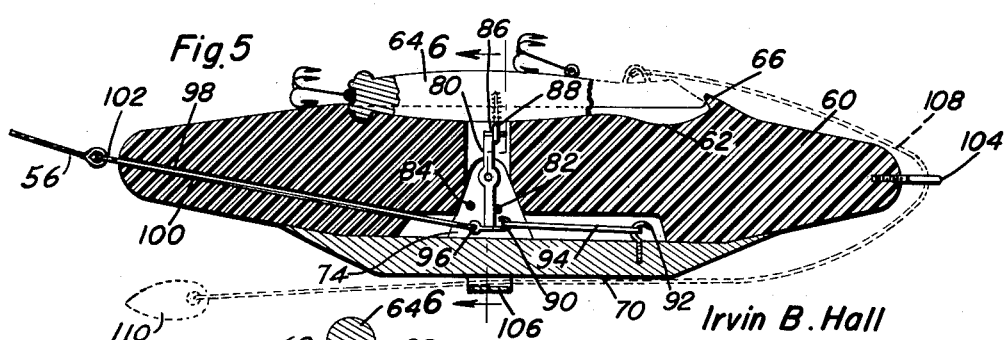
*Irvin B. Hall*
INVENTOR.
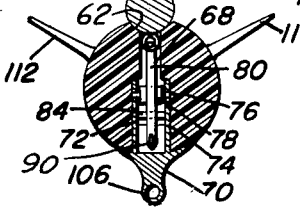

United States Patent Office 2,749,646
Patented June 12, 1956

2,749,646

LURE CASTING DEVICE

Irvin B. Hall, Fayetteville, N. C.

Application May 21, 1954, Serial No. 431,329

6 Claims. (Cl. 43—42)

This invention relates to a lure casting device and particularly to a body adapted to receive a lure and retain the same in position while the body is being cast after which the lure will be released for operation at a distance from the body.

In fishing operations such as surf casting it is extremely important that the lure be moved to as far a distance as possible from the shore. Heretofore various rigs have been devised for achieving maximum lure casting distances. However, with such devices it has been relatively impossible to cast a lure at any great distance from the shore.

According to the present invention a carrier is provided having sufficient weight that it may be cast at great distances for example distances of the order of 100 yards while a relatively light lure will be retained therein or thereon and carried by the casting weight until such time as the carrier has been deposited in the water and at which time the lure will be released therefrom and retained at a distance therefrom.

In the construction according to the invention the body is substantially of torpedo shape and constructed of substantially transparent material and has planes thereon for causing vertical motion of the carrier in the water and having a recess adapted to receive the lure with means for retaining the lure because of the tension of the casting line and for releasing the lure when the tension of the line has been released.

Accordingly, it is an object of the invention to provide an improved lure casting device which may be used to control the action of the lure and in which the lure may be released by intentionally relieving the tension of the casting line.

Other objects and many of the attendant advantages of the present invention will be apparent from the following detailed description taken in conjunction with the accompanying drawings in which:

Figure 1 is a perspective view of one form of the casting device;

Figure 2 is a longitudinal sectional elevation through the casting device taken substantially on the plane indicated by the section line 2—2 of Figure 3, and showing the construction and operation thereof;

Figure 3 is a cross-section through the device taken substantially on the plane indicated by the section line 3—3 of Figure 1;

Figure 4 is a perspective view showing the carrier and the lure attached thereto and the operating relation after having been cast;

Figure 5 is a sectional longitudinal elevation of a modification according to the invention showing the utilization of a weighted keel to give added impetus to the device;

Figure 6 is a cross-section of the modification of Figure 5 and taken substantially on the plane indicated by the section line 6—6 of Figure 5.

In the exemplification according to the invention an elongate substantially torpedo shaped body 10 is provided adjacent the forward end thereof with upwardly and outwardly diverging control planes 12 and 14. Also, if desired, a complemental rudder type plane 16 may be provided.

A recess 18 is provided on the upper surface of the body 10 and is substantially complementary to a lure 22. An eye 24 is provided in the after end of the body 10 and a guide hole 26 is provided and extends obliquely through the control plane 16 from one side to and opens through the other side. A leader 28 is connected to the lure 22 by any suitable means, such as an eye 30 and the leader extends through the eye 24 and slidingly through the guide hole 26 and it terminates beyond the guide hole in a stop member 32 which is such in size, relative to the hole 26 as to prevent it from being accidentally pulled back through said hole. Thus, the free end of the leader 28 is threaded through the oblique-angled hole 26 from one side of the plane to the other and the free end is tied into a knot in the manner and for the purposes stated. A transverse passage 34 is provided substantially adjacent the central portion of the body 10 and opens into the recess 18 which receives the lure 22. A block 36 is mounted in the recess 34 and is provided with a hook 38 adapted to engage an eye 40 on the bottom of the lure 22. An actuating member such as a fine rod, steel or nylon leader 42 extends through a passage 44 which extends substantially longitudinally of the body 10 and intersects the transverse passage 34. The actuating member 42 is provided adjacent the outer end thereof with an eye 46 for the attachment of a fish line thereto. The block 36 is rigidly connected to the actuating member 42 by any suitable means such as the setscrew 50. A resilient element herein shown as a spring 52 is provided for urging the block 36 to a position where the hook 38 will be disengaged from the lure 22. The eye 46 will have a suitable fish line 56 connected thereto so that when the device is suspended from the line 56 the resilient spring 52 will be compressed and move the hook 38 to engaging relation with the eye 40 on the lure 22.

In the modification shown in Figures 5 and 6 the elongated body 60 is provided with a top recess 62 for the reception of a lure 64 having a contour substantially complementary to the contour of the recess 62. An over-hanging abutment 66 is provided adjacent the after end of the recess 62 so that the end of the lure 64 is snugly received therein. A transverse passage 68 extends from the bottom of the lure upwardly into the recess 62 and a weighted plate or keel 70 constructed of suitable material such as stainless steel, brass, bronze or the like which does not corrode in salt water is rigidly attached to the bottom of the body 60 and has a pair of upstanding plates 72 and 74 which are rigidly connected to the keel 70 by any suitable means such as welding, brazing, soldering and the like. A pivot pin 76 having an enlarged spacer central portion 78 is fixed to and bridges the space between the plates 72 and 74. A latch-like line releasing arm 80 is pivotally mounted on the pivot pin 76 and the lower end of said arm has limited swinging movement between suitable cooperating stops 82 and 84. The releasable top end of the arm 80 is provided with a latch hook 86 adapted to be releasably engaged with an eye 88 on the bottom of the lure 64. A trip hook 90 is fixed on the lower end of the arm 80 and a second or anchor hook 92 is fixed on the keel member 70 in spaced relation thereto and a tension member, such as a synthetic rubber band 94, is connected with the hooks 90 and 92. An eye 96 is provided on the hook 90 and the body 60 is provided with a longitudinally extending passage 98 through which a leader or other actuating member 100 extends to be terminated in an eye 102 to which a fish line or other device may be attached. The after end of the device is provided with an eye 104 and a tubular guide 106 is provided on the keel 70. A leader 108 is attached to the lure 64 and extends through the eye 104 and the tubular guide 106 and terminates in a stop member 110. Upwardly and outwardly extending control planes 112 and 114 are substantially identical to the control planes 12 and 14 on the body 10.

In the utilization of the device according to the invention the line 56 will be properly connected to the eye 46 or 102 and the lure carrying body 10 or 60 will be grasped in the hand of the fisherman and the lure will be placed in the complementary recess on the top of the body. The weight of the body will then be suspended from the line so that the weight of the body will move the hooks 38 and 86 into engagement with the respective lures to retain the lures in place. During casting operations the line will provide sufficient tension on the device so that the resilient member will be tensioned to retain the lure in position. When the carrier reaches the end of its throw the line will be released so that the resilient member will bias the hook into inoperative position so that the lure will drop from the carrier and be in the water at the length of the distance of the leaders 28 or 108 respectively. Because of the weight of the lure the device will sink unless it is pulled inwardly, the pulling inwardly will cause the planes 12 and 14 or 112 and 114 to cause the device to move upwardly in the water.

With this carrier the smallest and lightest lures may be cast (pick-a-back fashion) several times the distance that it is possible to cast them with equipment now available, by using it in connection with the conventional long range surf casting equipment. It enables the surf fisherman to really send the small popular lures on out to where the large fish are, and to do so with a line of sufficient strength to reel back in most anything that might tackle the lure. It will be apparent to those skilled in the art that various changes and modifications may be made in the construction and arrangement of the parts thereof without departing from the true spirit and scope of the invention.

What is claimed as new is as follows:

1. A fish lure casting device comprising an elongated body, said body having a recess adapted to receive a fish lure, a hook mounted in said body and adapted to engage and releasably retain a lure in said recess, resilient means biasing said hook to released position, means for attaching a fish line in operative relation to said hook whereby tension on said fish line moves said hook to lure engaging and retaining position, and means for attaching said lure to said body.

2. A fish lure casting device comprising an elongated body, said body having a seating recess adapted to receive a fish lure, a hook mounted in said body and adapted to engage and releasably retain a lure in said recess, resilient means biasing said hook to released position, means for attaching a fish line in operative relation to said hook whereby tension on said fish line moves said hook to lure engaging position, a leader adapted to be attached to said lure, an eye fixed in said body, said leader being freely slidable through said eye, and a stop fixed on said leader, said stop being incapable of passing through said eye.

3. A fish lure casting device comprising an elongated body, said body having a recess adapted to receive a fish lure, a lure retaining and releasing hook mounted in said body and adapted to engage and releasably retain a lure in said recess, resilient means biasing said hook to lure releasing position, means for attaching a fish line in operative relation to said hook whereby tension on said fish line moves said hook to lure engaging position, a leader adapted to be attached to said lure, an eye fixed in said body, said leader being freely slidable through said eye, a stop fixed on said leader, said stop being incapable of passing through said eye, a weighted keel fixed on said body, a pivot bearing on said keel and extending into said body, and an arm pivotally mounted on said pivot bearing, said hook being mounted on said arm and said arm having an eye with which said fish line is operatively connected.

4. A fish lure casting device comprising an elongated substantially streamlined body, upwardly and outwardly diverging planes fixed on said body, said body having a recess in its dorsal surface adapted to conformingly receive a releasable lure, an upstanding abutment carried by said body and situated at the rear end of said recess and adapted to overhang an end of said lure, an eye in the after end of said body, a leader guide mounted on said body in opposed relation to said recess, a leader extending through said guide and said eye and being freely slidable therein, a stop on one end of said leader, said stop being incapable of passing through said guide, the other end of said leader being adapted for connection to said lure, an arm mounted in said body and provided with a hook adapted to engage said lure, and resilient means biasing said hook to lure releasing position.

5. A fish lure casting device comprising an elongated substantially streamlined body, upwardly and outwardly diverging planes on said body, said body having a recess adapted to receive a lure, an upstanding abutment at the rear end of said recess adapted to overhang and releasably retain an and of said lure, an eye in the after end of said body, a leader guide mounted on said body in opposed relation to said recess, a leader extending through said guide and said eye and being freely slidable therein, a stop on one end of said leader, said stop being incapable of passing through said guide, the other end of said leader being adapted for connection to said lure, a weighted keel on said body, a pair of upstanding spaced apart pivot plates fixed on said keel, an arm pivoted suspended between said plates, said body having a recess opening through the ventral surface thereof and encompassing said pivot plates, said plate encompassing recess communicating with said lure receiving recess, said arm being adapted for movement into engaging relation with a lure in said lure receiving recess, resilient means biasing said arm out of lure engaging position, a hook carried by said arm and adapted to releasably engage a complemental part of said lure in a manner to releasably seat and retain the lure in said receiving recess, and fishing line controlled means operatively connected with said arm.

6. A fish lure casting device comprising an elongated substantially streamlined body, said body being constructed with upwardly and outwardly diverging planes on said body, said body having a recess adapted to receive a lure, an upstanding abutment at the rear end of said recess adapted to receive an end of a lure, an eye in the after end of said body, a line guide mounted on said body in opposed relation to said recess, a leader extending through said guide and said eye and being freely slidable therein, a stop on one end of said leader, said stop being incapable of passing through said guide, the end of said leader being adapted for connection to said lure, a weighted keel on said body, a pair of upstanding spaced apart plates on said keel, an arm pivoted between said plates, said body having a recess adapted to receive said pivot plates, said plate receiving recess communicating with said lure receiving recess, said arm being adapted for movement into engaging relation with lure in said lure receiving recess, resilient means biasing said arm out of lure engaging position, a hook carried by said arm and adapted to releasably engage a complemental part of said lure in a manner to releasably seat and retain the lure in said receiving recess, said body having a passage extending from said pivot plate recess to the forward end of said body, and an actuating member attached to said arm and extending through said passage.

References Cited in the file of this patent

UNITED STATES PATENTS

| | | |
|---|---|---|
| 2,190,449 | Coldammer | Feb. 13, 1940 |
| 2,475,736 | Burrous | July 12, 1949 |
| 2,488,475 | Merritt | Nov. 15, 1949 |
| 2,531,418 | Fitzharris | Nov. 28, 1950 |
| 2,627,692 | Goodman | Feb. 10, 1953 |